United States Patent [19]

Zody

[11] Patent Number: 5,128,462
[45] Date of Patent: Jul. 7, 1992

[54] HYDROPHOBICALLY MODIFIED CARBOXYALKYL HYDROXYALKYL ETHERS OF POLYGALACTOMANNANS

[75] Inventor: George M. Zody, Louisville, Ky.

[73] Assignee: Rhone-Poulenc Inc., Monmouth Junction, N.J.

[21] Appl. No.: 724,588

[22] Filed: Jul. 1, 1991

[51] Int. Cl.$^5$ .......................... C08B 37/00; C07H 3/00
[52] U.S. Cl. .................................... 536/114; 536/120; 536/4.1
[58] Field of Search ................... 536/114, 120, 4.1, 52, 536/119

[56] References Cited

U.S. PATENT DOCUMENTS 4,137,400  1/1979  DeMartino et al. ................. 536/114
4,870,167  9/1989  Zody et al. ........................... 536/114

Primary Examiner—Johnnie R. Brown
Assistant Examiner—Everett White
Attorney, Agent, or Firm—Herbert P. Price

[57] ABSTRACT

Alkyl and hydroxyalkyl ethers of polygalactomannans are further modified with long chain haloalkanoic acids. The resulting derivatized polygalactomannans are useful as thickening agents in aqueous systems, particularly in combination with surfactants at acidic pH.

8 Claims, No Drawings

HYDROPHOBICALLY MODIFIED CARBOXYALKYL HYDROXYALKYL ETHERS OF POLYGALACTOMANNANS

BACKGROUND OF THE INVENTION

The field of art to which this invention pertains is polysaccharide derivatives.

Polygalactomannans and their derivatives are well known polysaccharide compositions which have many uses as thickening agents in aqueous systems.

The polygalactomannans are polysaccharides composed principally of galactose and mannose units and are usually found in the endosperm of leguminous seeds, such as guar, locust bean, honey locust, flame tree and the like. Guar gum, for example, is composed mostly of a polygalactomannan which essentially is a straight chain mannan with single membered galactose branches. The ratio of galactose to mannose in the guar polymer is 1:2.

Locust bean gum is a polygalactomannan of similar molecular structure in which the ratio of galactose to mannose is 1:4. Guar and locust bean gums are the preferred sources of polygalactomannans, principally because of their commercial availability.

Hydroxyalkyl polygalactomannans are made by reacting the polygalactomannans with an alkylene oxide having at least two and, preferably, three or more carbon atoms as disclosed in U.S. Pat. No. 3,483,121. Polygalactomannans, as stated hereinabove, are composed of units of galactose and mannose sugars, each of which has an average of three hydroxyl sites. The alkylene oxide reacts with the hydroxyl groups to produce hydroxyalkyl ether derivatives. Each unit of alkylene oxide added to the polygalactomannan in turn adds a new hydroxyl group which is itself reactive. Theoretically, there is no limit to the amount of alkylene oxide which may be added to the polygalactomannan. As a practical matter however, a molecular substitution (M.S.) of about 4 or 5 is a practical upper limit.

Carboxyalkyl ethers of polygalactomannans are made by reacting the polygalactomannan with a halofatty acid or with acrylonitrile or methacrylonitrile followed by hydrolysis of the nitrile group to a carboxylic acid groups. Such carboxyalkyl ether derivatives contain one to three carbon atoms in the alkyl group and are described in a number of patents, examples of which are U.S. Pat. Nos.: 2,477,544; 2,520,161; 2,599,771; 3,679,658; 3,712,883; and 3,740,388.

Hydroxyalkyl ether-carboxyalkyl ether mixed derivatives of polygalactomannans are described in U.S. Pat. No. 3,723,408. The disclosed mixed derivatives contain three to eight carbon atoms in the hydroxyalkyl groups and two to four carbon atoms in the carboxyalkyl groups.

Polygalactomannans containing both hydrophilic and hydrophobic groups are disclosed in U.S. Pat. Nos. 4,870,167 and 4,960,876. In these patents, the hydrophilic groups are alkyl or hydroxyalkyl groups containing one to four carbon atoms or short alkyl chain carboxyl or amino substituents. The hydrophobic groups are substituents containing eight to thirty-two carbon atoms.

SUMMARY OF THE INVENTION

This invention is directed to polygalactomannan derivatives containing both hydrophilic groups and hydrophobic groups, wherein the hydrophobic groups contain a carboxyl substituent.

The compositions of this invention are poly(alkyl ethers) of polygalactomannans having at least two different ether substituents. One substituent is an alkyl substituent selected from the group consisting of R and $HOR^1$ wherein R is an alkyl group containing one to four carbon atoms, wherein $R^1$ is an alkylene group containing two to four carbon atoms and wherein the OH group is on the carbon atom beta to the ether group. The other substituent is

$$HO\overset{O}{\overset{\|}{C}}-R^2$$

wherein $R^2$ is an alkylene group containing 7 to 21 carbon atoms and wherein the carboxylic acid substituent is on the terminal carbon atom, i.e., omega to the ether group.

The compositions of this invention are efficient thickening agents for aqueous systems either alone or combined with a surfactant. Under acidic pH conditions, the compositions form gels in water which convert to low viscosity fluids when the pH is raised to 7 or above. The gelling and thinning are completely reversible with pH changes.

DESCRIPTION OF INVENTION

The alkyl ethers of polygalactomannans which are first formed in this invention are the methyl, ethyl, propyl, butyl hydroxyethyl, hydroxpropyl and hydroxybutyl ethers of the polygalactomannans. Such alkyl ethers can be prepared by dispersing a polygalactomannan as a powder in an organic solvent which is substantially inert and practically non-reacting under the reaction conditions with alkyl halides and alkylene oxides and further which is at least partially water miscible. The dispersed powder is then admixed with an aqueous alkali, such as an alkali metal hydroxide solution, and after a short time, a lower alkyl halide or alkylene oxides e.g., methyl chloride, ethyl bromide, ethylene oxide, propylene oxide or butylene oxide, is added to the mixture. The reaction can be conducted at elevated temperatures and/or under pressure. When the reaction is completed, the hydroxyalkylated polygalactomannan is recovered by filtration.

Alkyl ethers of polygalactomannans can also be prepared by reacting guar splits with an alkyl halide or an alkylene oxide. Guar gum splits are obtained after the removal of the hulls and the germs from guar seeds. The guar gum splits are mixed with sufficient water and alkali to swell the splits but insufficient to form a gel. The alkyl halide or the alkylene oxide is then added and the reaction is carried out under agitation, usually in an apparatus such as a ribbon blender. When the reaction is complete, the guar reaction product, still in particulate form, is washed to remove excess alkali, or salt formed in the reaction. The hydroxyalkylated guar gum is then dried on a drum dryer to a moisture content of below 10 percent and is then flaked in a hammer mill.

The alkyl ethers of polygalactomannans useful in this invention have a M.S. (molecular substitution) of about 0.5 to about 1.5. The preferred composition for use in this invention is methyl guar, hydroxyethyl guar and hydroxypropyl guar with hydroxypropyl guar having an M.S. of 0.6 to 1.2 being most preferred.

The compositions of this invention are prepared by reacting the alkyl ethers of the polygalactomannan with a haloalkanoic acid wherein the alkanoic group contains 8 to 22 carbon atoms and the halo group is on the terminal carbon atom, omega to the acid group. Examples of such acids are 8-chloro octanoic acid, 10-bromodecanoic acid, 12-bromododecanoic acid, 14-iodotetradecanoic acid, 16-bromohexadecanoic acid, 18-chloro octadecanoic acid, 20-iodoeicosanoic acid, and 22-chlorodocosanoic acid. The preferred halo compounds are the bromo compounds. The preferred haloalkanoic acids are 10 to 16 carbon acids.

The reaction of the long chain compounds with the alkyl ether of the polygalactomannan is conducted in a solvent under alkaline catalysis. The solvent must be one which swells and, preferably, does not dissolve the hydroxyalkyl ether and must be miscible with the long chain compound. By using such a solvent, the long chain compound can intimately contact the polygalactomannan so that the alkylation reaction can take place. The solvent must also be able to absorb some water, at least about 10 up to about 50 weight percent based on the weight of the total system, since the reaction is not conducted under completely anhydrous conditions. Examples of suitable solvents are methanol, ethanol, isopropanol, dimethyl formamide and bis(2-methoxyethyl)ether. The preferred solvents are methanol and isopropanol.

Minor amounts of other solvents which are not miscible with water and are non polar can be used in combination with the water miscible solvents. Examples of such solvents are heptane and octane.

The alkaline catalysts used in this invention are sodium hydroxide and potassium hydroxide. Such catalysts are preferably used as an alcoholic solution but can be used as an aqueous solution or added as a solid.

The reaction of the alkyl polygalactomannan and the long chain compound is conducted under substantially but not completely anhydrous conditions. The alkyl polygalactomannan use in the invention will contain about 5 to about 15 weigh percent water based on the total weight of the polygalactomannan and water. The alkaline catalysts also may contain a small amount of water. It is preferred that the water content of the reaction be less than about 10 weight percent based on the total weight of solvent, catalyst and polygalactomannan.

In preparing the compositions of this invention, the alkaline catalyst is used in amounts in excess over the halo equivalent of the haloalkanoic acid used in the reaction and also over the carboxylic acid equivalency. This excess amount will vary from about 0.5 weight percent up to about 10 weight percent based on the weight of th haloalkanoic acid.

The amount of solvent used in preparing the composition of this invention will be that amount which allows the reactants to be stirred. Generally this amount will be an amount which is at least equal to the weight of the polygalactomannan, and preferably, at least about twice the weight of the polygalactomannan. From a theoretical standpoint there is no upper limit to the amount of solvent that can used. However, from a practical standpoint, usually no more than about 5 times the weight of the polygalactomannan is used.

The D.S. (degree of substitution) of the long chain derivative of this invention is about 0.001 to about 0.2 and, preferably, about 0.005 to about 0.10. These D.S. values are obtained by reacting the polygalactomannan with about 0.1 to about 10 weight percent of the long chain halo alkanoic acid and preferably about 1 to about 5 weight percent wherein said percents are based on the weight of the polygalactomannan.

The reaction for preparing the composition of this invention is conducted by dispersing the alkylated polygalactomannan in the solvent followed by the addition of the long chain compound. The reaction vessel is purged with an inert gas before adding the alkaline catalyst. Sufficient time is allowed to let the polygalactomannan swell. Generally this time will be about 5 minutes to about 1 hour. The alkaline catalyst, usually dissolved in an alcohol, is then added and the reaction is conducted for a period of about 1 to about 5 hours. The reaction is conducted at room temperature up to about 80° C., and, preferably, at about 55° C. to about 75° C. When the reaction is completed, the product is recovered by filtration. It is washed to remove unreacted components, and is then filtered and dried.

Under the conditions in which the long chain alkylation reaction is conducted in this invention, underivatized polygalactomannans, i.e., guar gum or locust bean gum, do not react with the long chain haloalkanoic acid. In order for the reaction to take place, the polygalactomannan must first be alkylated with a short chain alkyl halide or alkylene oxide.

The viscosity of aqueous solutions of the compositions of this invention is enhanced by the addition of anionic or nonionic surfactants. The viscosity is increased by the addition of very small amounts of surfactant, i.e., 1 drop of surfactant in 400 mls of a 0.5 weight percent aqueous solution of the gum. Generally, about 10 ppm of surfactant up to about 1 percent by weight of surfactant are used based on the weight of the aqueous solution. Preferably, about 0.01 to about 0.2 percent by weight are used.

Any water soluble anionic or nonionic surfactant can be used in this invention. The preferred surfactants have an HLB of at least 7 and, more preferably, at least 10. Examples of suitable anionic surfactants are alkali metal, ammonium and amine soaps, such as sodium and potassium myristate, laurate, palmitate, oleate, stearate, resinate and hydroabietate, the alkali metal alkyl or alkylene sulfates, such as sodium lauryl sulfate, potassium stearyl sulfate, the alkali metal alkyl or alkylene sulfonates, such as sodium lauryl sulfate, potassium stearyl sulfate, the alkali metal alkyl or alkylene sulfonates, such as sodium lauryl sulfonate, potassium stearyl sulfonate and sodium cetyl sulfonate, sulfonated mineral oil, as well as the ammonium salts thereof.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow and alkali salts of short chain petroleum sulfonic acids.

Examples of suitable nonionic surfactants are condensation products of higher fatty alcohols with ethylene oxide, such as the reaction product of of oleyl alcohol with 10 ethylene oxide units; condensation products of alkyl phenols with ethylene oxide, such as the reaction products of isoctylphenol with 12 ethylene oxide units; condensation products of higher fatty acid amides with 5, or more ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, polyhydric tristearate, ethylene oxide condensation products of polyhydric alcohol partial higher fatty esters, and their inner anhydrides (mannitol-anhydride, called Mannitan, and sorbitol-anhydride called Sorbitan), and as glkycerol monopalmitate reacted with 10 molecules of ethylene oxide, pentaerythritol monoleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxy group is etherified with a low molecular weight alcohol, such as methoxypolyethylene glycol 550 monostearate (550 meaning the average molecular weight of the polyglycol ether). A combination of two or more of these surfactants can be used.

The viscosity of aqueous solutions of the compositions of this invention is pH dependent, particularly aqueous solutions which also contain surfactants. Under acid conditions, the solutions have a high viscosity and show a gel-like character. When the pH is adjusted to 7 or higher, the viscosity decreases and the solutions are fluid with no gel characteristics. It is theorized that under acid conditions, the carboxyl group at the end of the long chain is hydrophobic and associates with the surfactant micelle. When the pH is raised to 7 or higher, the carboxyl group is salted forming a hydrophilic end group which disrupts the association with the surfactant. The system is fully reversible in that the solution can be continuously changed from gel-character to fluid-character and then back to gel-character simply by adjusting the pH from acidic to basic back to acidic.

The following examples describe the invention in more detail. Parts and percentages are by weight unless otherwise designated.

EXAMPLE 1

To a suitable reactor were added 162 parts of isopropanol, 18 parts of heptane, 45 parts of hydroxypropyl guar having a M.S. of 1.2, and 1 part of 12-bromododecanoic acid. Agitation was begun and the reactor contents were sparged with nitrogen for 15 minutes. Sparging was then discontinued and nitrogen was introduced as a sweep over the surface of the reactor contents. Heat was applied and when the temperature reached 60° C., 2 parts of potassium hydroxide were added. Heating was continued for 1 hour at 60° C. The temperature was then lowered to 25° C. and 200 parts of acetone were added. The resulting mixture was filtered to remove the liquids, and was washed with acetone. The product was then air dried.

Two parts of the air dried product were dissolved in 400 parts of water and the pH was adjusted to 7.5. After one hour hydration time, the viscosity was 72 cps as determined with a Brookfield viscometer, No. 1 spindle at 20 RPM. The pH was adjusted to 5.0 using 10 percent aqueous hydrochloric acid. The viscosity was determined to be 70 cps. Ammonium lauryl sulfate (ALS) (28 percent solution in water) was added in 0.2 ml increments and the viscosity was determined after each addition. After the final addition of ammonium lauryl sulfate, the pH was adjusted to 7.5 with 1 Normal sodium hydroxide solution and the viscosity was determined. The ammonium lauryl sulfate additions with the corresponding viscosities and pH values are shown in Table 1.

TABLE 1

| ml ALS | Viscosity cps | pH |
|---|---|---|
| 0 | 72 | 7.5 |
| 0 | 70 | 5.0 |
| 0.2 | 85 | 5.0 |
| 0.4 | 165 | 5.0 |
| 0.6 | 621 | 5.0 |
| 0.8 | 1,900 | 5.0 |
| 1.0 | 4,150 | 5.0 |
| 1.2 | 4,700 | 5.0 |
| 1.4 | 4,700 | 5.0 |
| 1.6 | 4,850 | 5.0 |
| 1.8 | 3,520 | 5.0 |
| 1.8 | 70 | 7.5 |

EXAMPLE 2

To a suitable reactor were added 180 parts of isopropanol, 45 parts of hydroxypropyl guar of M.S. 1.2 and 1 part of 12-bromododecanoic acid. The reactor contents were purged with nitrogen and were kept under a nitrogen blanket throughout the reaction. Agitation was begun and after 10 minutes, the temperature was raised to 70° C. A mixture of 2 parts of potassium hydroxide and 8 parts of methanol was added. Agitation and heating were continued for 1 hour. The temperature was lowered to room temperature, and the reactor contents were discharged into 1000 parts by volume of acetone. After filtering, the derivatized product was vacuum dried.

Two parts of the derivatized product were added to 400 parts of deionized water. The pH was adjusted to 6.5 with 10 percent aqueous hydrochloric acid and after hydrating for 24 hours, the viscosity of the solution was 50 cps. The pH was adjusted to 3.5 with no change in viscosity. Half milliliter of a 28 percent solution of ammonium lauryl sulfate in water was added. The viscosity increased to 3000 cps. The pH was adjusted to 8.0 with dilute aqueous caustic. The pH dropped to 50 cps. The pH was then adjusted to 5.0. The viscosity rose to 3000 cps.

EXAMPLE 3

To a suitable reactor were added 45 parts of hydroxypropyl guar having a M.S. of 1.2; 1.5 parts of 12-bromododecanoic acid, 9 parts of heptane and 170 parts of isopropanol. Agitation and nitrogen sparge were begun and the temperature was raised to 50° C. Potassium hydroxide, 2 parts, and 8 parts of methanol were added. Heating at 50° C. was continued for 1 hour. The temperature was lowered to 25° C., and the reactor contents were washed with 3 volumes of acetone and were filtered to remove the liquid. The product was then air dried.

Two parts of the air dried product were added in 400 parts of water and the pH was adjusted to 7.5 with 10 percent aqueous hydrochloric acid. After mixing for 1 hour on a stirplate, the solution was allowed to hydrate overnight. The Brookfield viscosity was 80 cps. The pH was adjusted to 5.0 with 10 percent aqueous acetic acid. The viscosity remained at 80 cps. Ammonium lauryl sulfate (28 percent solution in water) was added in 0.1 ml increments and the viscosity was determined after each addition. The viscosity originally at 80 cps, gradually rose to a peak viscosity of 324 cps after 1.7 mls of ALS solution had been added, and then slowly dropped to 148 cps after 3.0 mls of ALS solution had been added.

Another two parts of air dried product were dissolved in 400 parts of water using the procedure described hereinabove. The pH was adjusted to 5 with 10 percent aqueous acetic acid followed by the addition of 1.5 mls of a 28 percent solution of ALS in water. The viscosity was determined to be 1300 cps. When the pH was adjusted to 9.0 with 1N NaOH, the viscosity became water thin. The pH was readjusted to 5 with 10 percent acetic acid. The viscosity rose to 1180 cps.

EXAMPLE 4

To a suitable reactor were added 445 parts of isopropanol, 145 parts of heptane, 3 parts of 11-bromododecanoic acid and 99 parts of hydroxypropyl guar having a M.S. of 1.2. Agitation was begun and the reactor contents were sparged with nitrogen. The temperature was raised to 60° C. and 2 parts of potassium hydroxide were added. The temperature was held at 60° C. for 3 hours. The temperature was then lowered to 25° C. and the reactor contents were washed with acetone, filtered, and air dried.

Two parts of the air dried product were added to 400 parts of water and were allowed to hydrate overnight. The Brookfield viscosity was 60 cps at pH of 5.5. At a pH of 3.0, the pH was 220 cps.

The principles, preferred embodiments and modes of operation of the present invention have been described in the foregoing specification. The invention which is intended to be protected herein, however is not to be construed as limited to the particular forms disclosed, since they are to be regarded as illustrative rather than restrictive. Variations and changes may be made by those skilled in the art without departing from the spirit and scope of the invention.

What is claimed is:

1. A polygalactomannan derivative wherein one substituent is selected from the group consisting of R and $HOR^1$, wherein R is an alkyl group containing one to 4 carbon atoms, wherein $R^1$ is an alkylene group containing two to four carbon atoms and wherein the OH group is on the carbon atom beta to the ether group, wherein the other substituent is

wherein $R^2$ is an alkylene group containing 7 to 21 carbon atoms and wherein the carboxylic acid substituent is on the terminal carbon atom, omega to the ether group, wherein the substituent, R or $HOR^1$, is present in a M.S. of about 0.5 to about 1.5, and wherein the substituent

is present in a D.S. of about 0.001 to about 0.2.

2. The derivative of claim 1 wherein the polygalactomannan is guar gum.

3. The derivative of claim 1 wherein the polygalactomannan is locust bean gum.

4. The derivative of claim 1 wherein R is methyl.

5. The derivative of claim 1 wherein $HOR^1$ is hydroxypropyl.

6. The derivative of claim 1 wherein $R^2$ contains 9 to 15 carbon atoms.

7. The derivative of claim 1 wherein the M.S. of the substituents R and $HOR^1$ is about 0.6 to about 1.2.

8. The derivative of claim 1 wherein the D.S. of the substituent

is about 0.005 to about 0.10.

* * * * *